(No Model.)
F. W. HARRIS.
DEVICE FOR OILING WHEELS.
No. 404,481. Patented June 4, 1889.
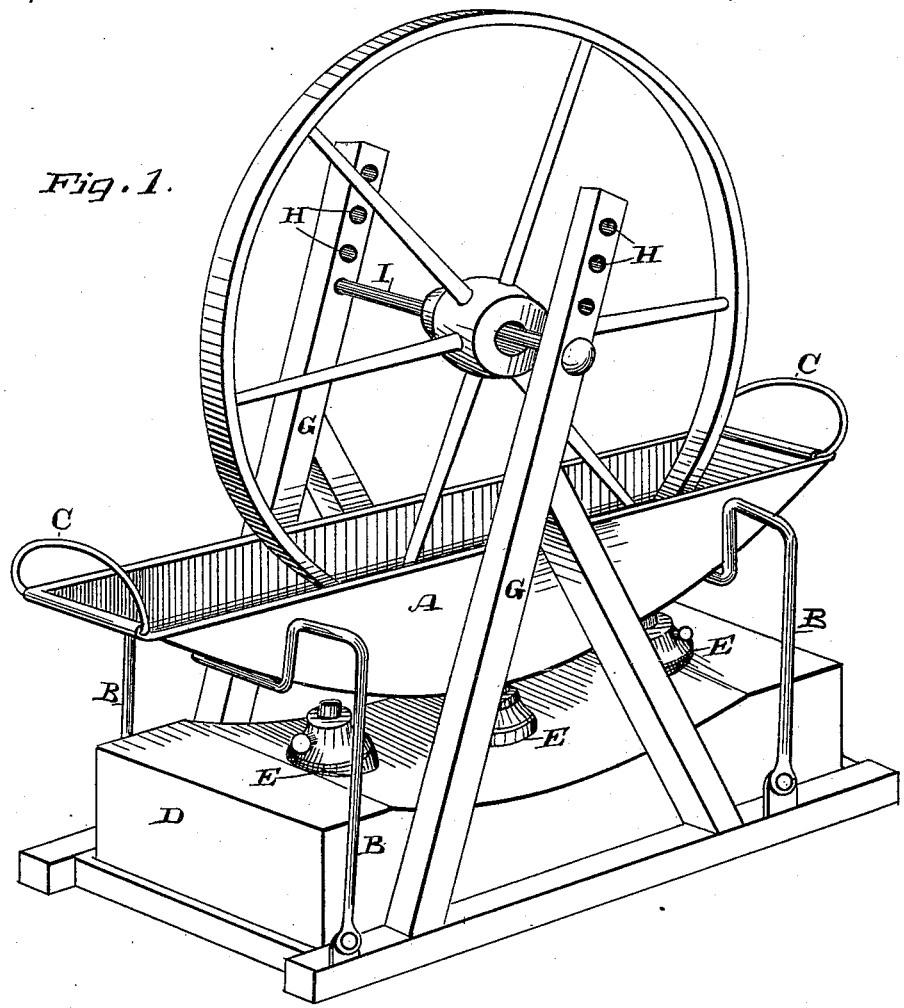
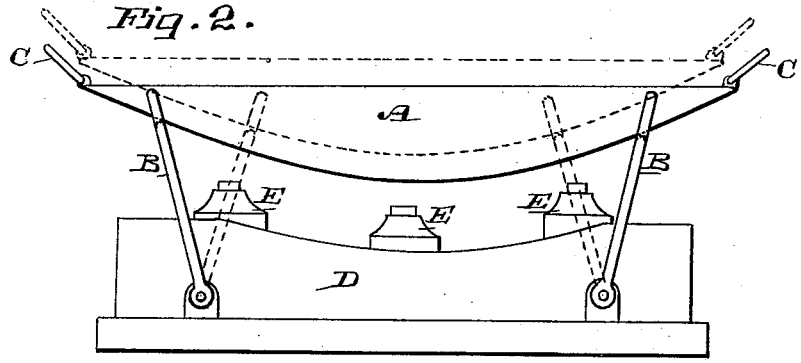
Witnesses,
Geo. H. Strong
J. H. Nourse
Inventor,
F. W. Harris
By Dewey & Co.
att'ys

UNITED STATES PATENT OFFICE.

FRANK W. HARRIS, OF NAPA, CALIFORNIA.

DEVICE FOR OILING WHEELS.

SPECIFICATION forming part of Letters Patent No. 404,481, dated June 4, 1889.

Application filed November 1, 1888. Serial No. 289,780. (No model.)

*To all whom it may concern:*

Be it known that I, FRANK W. HARRIS, of Napa, Napa county, State of California, have invented an Improvement in Devices for Oiling Wheels; and I hereby declare the following to be a full, clear, and exact description of the same.

My invention relates to a device for heating and applying oil to the fellies of wooden wheels; and it consists of a segmental trough adjustably supported upon standards, a lamp or heater fixed with relation to said trough so as to heat its contents, and standards upon each side for the support of the shaft upon which the wheel is mounted, said holes serving for the adjustment of the spindle to different heights to suit different diameters of wheels.

Referring to the accompanying drawings for a more complete explanation of my invention, Figure 1 is a perspective view of my invention. Fig. 2 is a side elevation showing the manner of raising and lowering the trough.

In those countries which have a rainless season similar to that of California, the wooden portion of vehicle-wheels becomes so dry and contracted that the tires will be loose upon the wheels, and if they are shrunk so as to fit the wheels in that condition the wheels will, when they are again swollen by the wet weather, be greatly dished and the spokes bent out of shape, the wheel being ultimately soon destroyed.

By my apparatus I am enabled to apply boiling linseed-oil to the fellies and spoke ends, and it will, when thus applied, penetrate the wood and swell it, so that the tires will remain tight throughout the dry season, the expansion and contraction of the wood being reduced by this means to a minimum.

In order to conveniently heat and apply the oil, I make a segmental trough A, the bottom of which is curved, as shown, and the sides are sufficiently high, so that it will contain the oil necessary to allow the rim of any wheel to dip into it when rotated above the tank. This tank is supported upon standards B in the form of brackets, in which the curved portion is placed, and by moving these standards slightly to or from each other the tank may be raised or depressed without other mechanism. The handles C at each end of the tank enable the operator to conveniently move it when desired. Beneath the tank is fixed a receiver D, having as many burners E as may be necessary, these burners standing beneath the bottom of the tank, as shown, and the reservoir being supplied with any burning-oil the lamps may be lighted, and the oil within the tank will soon be heated to any desired degree. Upon each side of this apparatus are fixed two standards or supports G, properly braced, as shown, and having holes H bored through them for the reception of a pin or shaft I.

The operation is very simple. The wheel to be treated is supported above the tank, and the pin or shaft I passed through the hole in the hub, its ends being supported in the two standards, as shown. The rim of the wheel will dip into the oil in the tank, and the wheel may be rotated so as to expose all portions of the wheel to the action of the heated oil. When the wood has become saturated with the oil, the wheel may be removed and another one treated in a similar manner.

The shaft or pin may pass through any of the holes in the standards, to accommodate it to wheels of different sizes, and, if desired, the tank may be raised or depressed slightly upon its standards, either with reference to the heating-lamps or to the rim of the wheel.

I am aware that tanks have been employed for the purpose of oiling or treating the rims of wheels, and I do not claim such a device, broadly; but What I do claim as new, and desire to secure by Letters Patent, is—

1. A device for treating the fellies of wooden wheels, consisting of a segmental tank and supporting-standards, said standards being movable toward and from each other, whereby the tank is vertically adjusted, in combination with a lamp or heater beneath said tank, and other standards upon which a shaft or pin passing through the wheel-hub is supported, substantially as herein described.

2. The segmental removable tank, with movable standards for adjusting its height, a lamp or heater beneath the tank, and standards upon each side having the holes H, and with a shaft the height of which is adjustable in said holes to support wheels of different sizes with their rims dipping into the tank, substantially as herein described.

In witness whereof I have hereunto set my hand.

FRANK W. HARRIS.

Witnesses:
 S. H. NOURSE,
 H. C. LEE.